(12) United States Patent
Chen et al.

(10) Patent No.: US 8,199,480 B2
(45) Date of Patent: Jun. 12, 2012

(54) CHIP CARD HOLDER AND PORTABLE ELECTRONIC DEVICE USING THE SAME

(75) Inventors: Bao-Jiang Chen, Shenzhen (CN); Guan-Yu Zhou, Shenzhen (CN); Yue-Sheng Zhang, Shenzhen (CN); De-Lin Li, Shenzhen (CN); Peng Jiang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 401 days.

(21) Appl. No.: 12/420,917

(22) Filed: Apr. 9, 2009

(65) Prior Publication Data

US 2010/0073891 A1    Mar. 25, 2010

(30) Foreign Application Priority Data

Sep. 25, 2008   (CN) .......................... 2008 1 0304654

(51) Int. Cl.
*G06F 1/16* (2006.01)
(52) U.S. Cl. ......... 361/679.31; 361/679.56; 361/679.58; 455/575.1; 455/575.4; 312/223.1; 312/223.2
(58) Field of Classification Search .............. 361/679.31
See application file for complete search history.

(56) References Cited

U.S. PATENT DOCUMENTS

| 5,337,220 | A  | * | 8/1994  | Granitz ......................... 361/816 |
| 5,473,505 | A  | * | 12/1995 | Kessoku et al. .......... 361/679.32 |
| 5,573,413 | A  | * | 11/1996 | David et al. .................... 439/159 |
| 5,615,250 | A  | * | 3/1997  | Kobayashi ..................... 455/558 |
| 6,018,669 | A  | * | 1/2000  | Stoegmueller ................ 455/558 |
| 6,101,372 | A  | * | 8/2000  | Kubo ............................. 455/558 |
| 6,138,916 | A  | * | 10/2000 | Zolkos et al. ................. 235/475 |
| 6,385,040 | B2 | * | 5/2002  | Nabetani et al. .......... 361/679.32 |
| 6,493,033 | B1 | * | 12/2002 | Glogan et al. ................ 348/375 |
| 6,503,092 | B1 | * | 1/2003  | Sato .............................. 439/159 |
| 6,580,923 | B1 | * | 6/2003  | Kubo ............................. 455/558 |
| 6,704,204 | B1 | * | 3/2004  | Eskildsen et al. ............. 361/737 |
| 6,802,448 | B2 | * | 10/2004 | Bricaud et al. ................ 235/451 |
| 6,934,159 | B2 | * | 8/2005  | Nogami ........................ 361/726 |
| 7,699,659 | B2 | * | 4/2010  | Chen et al. .................... 439/630 |
| 2011/0058327 | A1 | * | 3/2011 | Chen et al. .............. 361/679.32 |

* cited by examiner

*Primary Examiner* — Anthony Q Edwards
(74) *Attorney, Agent, or Firm* — Altis Law Group, Inc.

(57) ABSTRACT

A chip card holder used to hold a chip card comprises a housing having a slot defined therein for receiving the chip card therein, and an end wall, the housing including a latching portion extending from the end wall; a holder part slidably assembled in the slot of the housing; an elastic part resisted between the housing and the holder part. The holder part releasably latches to the latching portion, when the latching portion is removed from the holder part, the holder part slides away from the end wall under the expansion of elastic part and push the chip card out of the slot.

16 Claims, 7 Drawing Sheets

CHIP CARD HOLDER AND PORTABLE ELECTRONIC DEVICE USING THE SAME

BACKGROUND

1. Technical Field

The present invention relates to chip card holders and, particularly, to a chip card holder used in a portable electronic device.

2. Description of Related Art

Portable electronic devices such as mobile phones and personal digital assistants (PDAs) are widely used. The portable electronic devices typically have a chip card (e.g., SIM card) for storing information. Chip card holders are used to hold/secure the chip card within portable electronic devices.

Referring to FIG. 7, a typical chip card holder often includes a body member and a cover member connected to the body member. The body member includes a base 32 and a locking part 34. The base 32 defines a receiving cavity 321 to receive the chip card therein. A bottom of the receiving chamber 321 defines a connecter 30. The locking part 34 is slidably assembled on the base 32 and adjacent to the receiving chamber 321. When the chip card is to be assembled, the locking part 34 is moved away from the receiving chamber 321. The chip card is positioned in the receiving chamber 321. The locking part 34 is then reversely moved to lock the chip card in the receiving chamber 321.

However, during installation and removal of the chip card, the locking part 34 must be moved twice and the portable electronic devices must be inverted to be detached from the chip card holder. Thus, installation and removal of the chip card are inconvenient.

Therefore, there is room for improvement within the art.

BRIEF DESCRIPTION OF THE DRAWINGS

Many aspects of the chip card holder can be better understood with reference to the following drawing. The components in the drawing are not necessarily drawn to scale, the emphasis instead being placed upon clearly illustrating the principles of chip card holder. Moreover, in the drawing like reference numerals designate corresponding parts throughout the several views, in which.

DETAILED DESCRIPTION OF THE PREFERRED EMBODIMENTS

Figure 1:
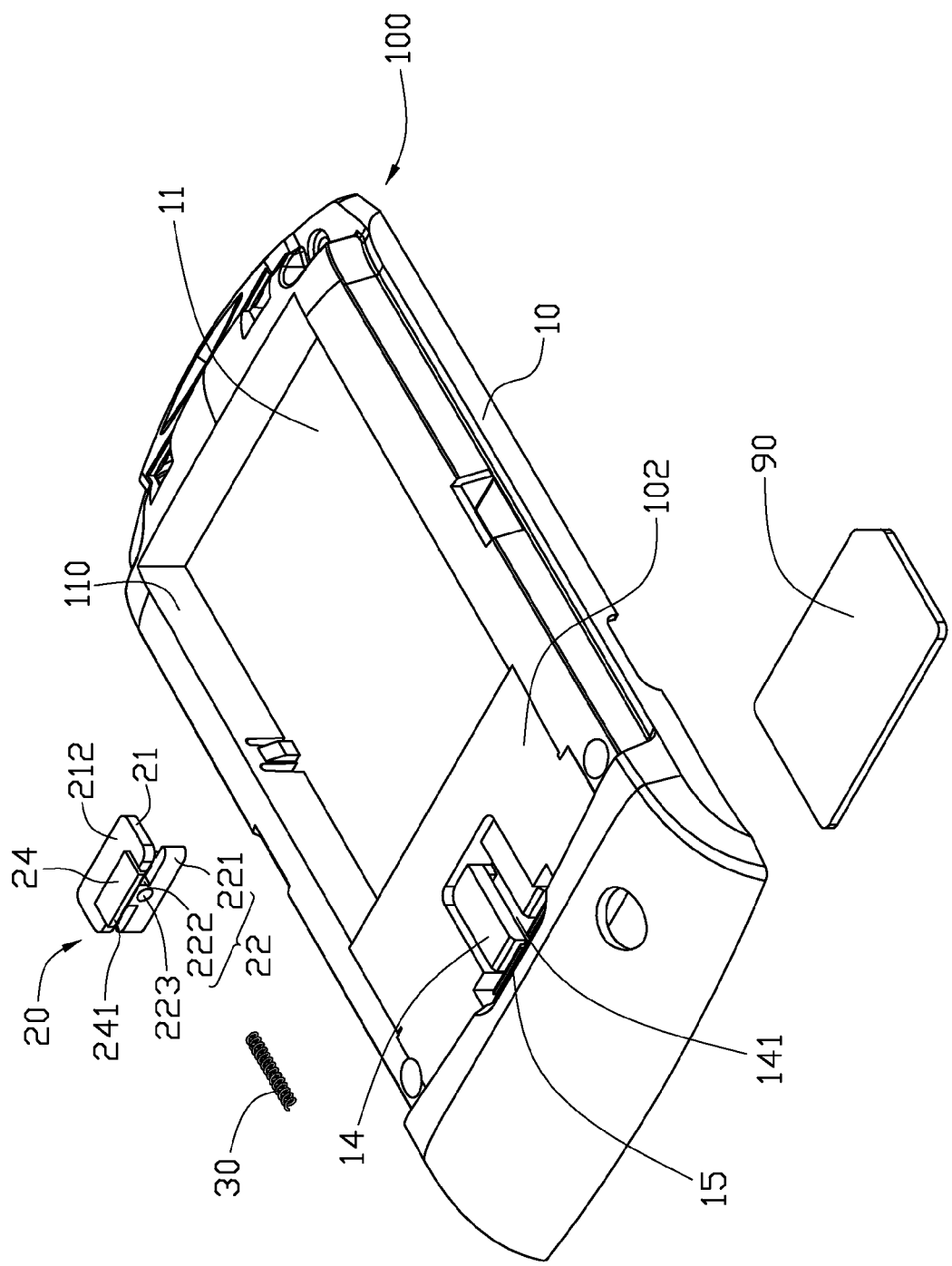
FIG. 1 is an exploded, isometric view of a chip card holder according to an exemplary embodiment.
Figure 2:
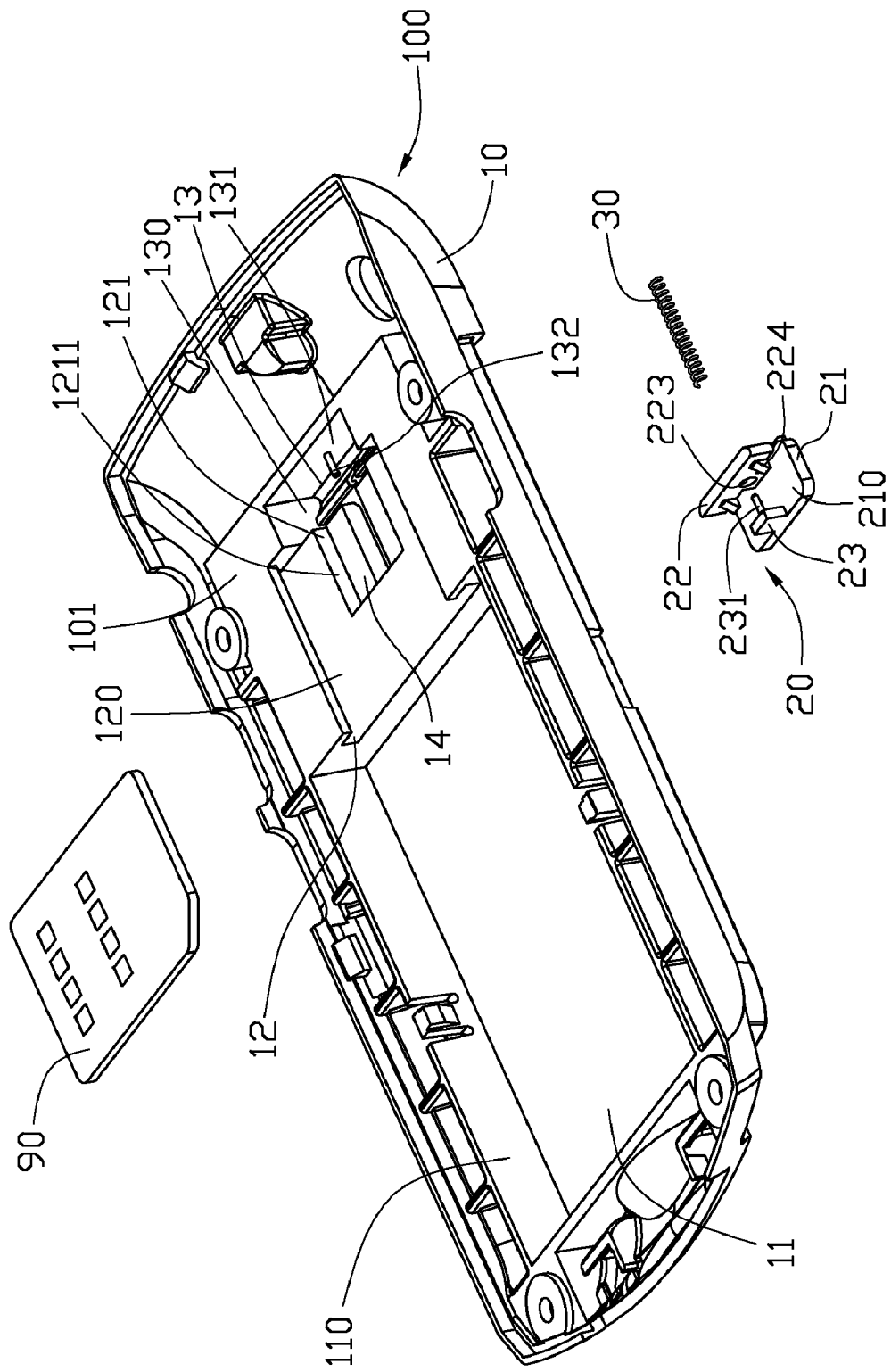
FIG. 2 is another exploded, isometric view of the chip card holder shown in FIG. 1.

FIGS. 1 and 2 show an exemplary chip card holder 100 used to hold a chip card 90. The chip card holder 100 includes a housing 10, a holder part 20 slidably assembled in the housing 10, and an elastic part 30 latching to the holder part 20.

The housing 10 is a substantially rectangular structure including an upper wall 101 and a lower wall 102 positioned opposite to the upper wall 101. The housing 10 defines a chamber 11 enclosed by four chamber walls 110. The housing 10 defines a slot 12 in the upper wall 101 and adjacent to the chamber 11. The slot 12 is a converse T-shaped structure and communicates with the chamber 11. The chip card 90 can be assembled in the slot 12 and electrically connected to a chip card connector (not shown). The slot 12 has a bottom wall 120 defining an opening 121. Sidewalls 1211 enclose the opening 121. The housing 10 defines a through hole 13 adjacent to the opening 121. The through hole 13 is enclosed by opposite sidewalls 130 and an end wall 131 oriented away from the opening 121. Each of the opposite sidewalls 1211 has an extending portion 14 extending from the sidewalls 1211. The extending portions 14 cooperatively define a slide slot 141 therebetween. The holder part 20 is slidable in the slide slot 141 and can be slidably engaged with the extending portions 14. A protruding post 132 extends from a middle of the end wall 131 and is configured for interacting with the elastic part 30. A latching portion 15 obliquely extends toward the opening 121 from the end wall 131. The latching portion 15 and the end wall 131 define an included angle therebetween. A free end of the latching portion 15 has a clasp 151 configured for latching the holder part 20.

Figure 3:
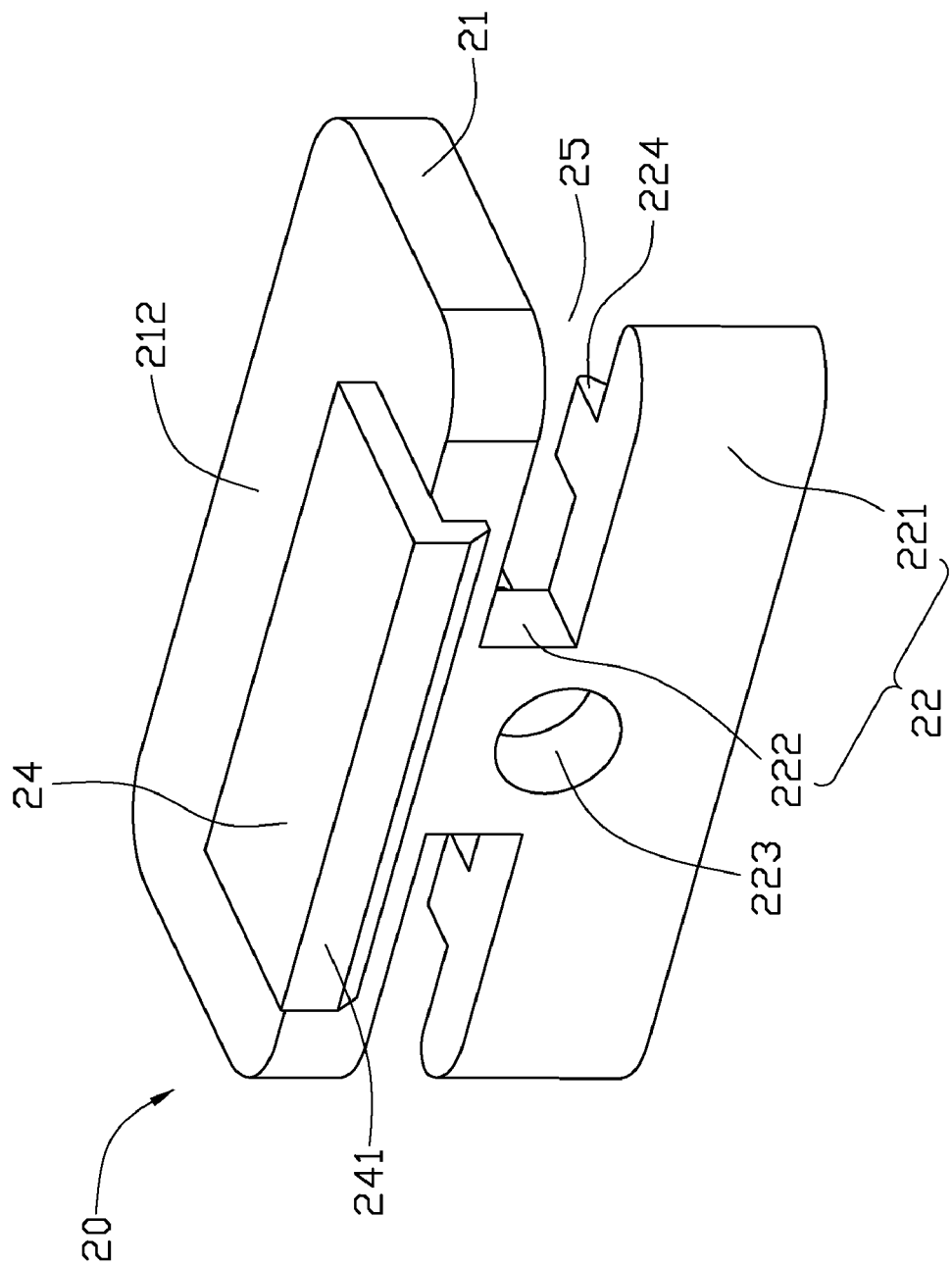
FIG. 3 is an isometric view of a holder part.

Referring to FIG. 3, the holder part 20 includes a base 21, a guiding plate 22, a stop plate 23, and a snap plate 24. The base 21 is a substantially rectangular structure including an upper surface 210 and an opposite lower surface 212. The guiding plate 22 is a T-shaped structure including a first guiding plate 221 and a second guiding plate 222 extending from a middle of the first guiding plate 221 to the upper surface 210 such that the first guiding plate 221 and the base 21 define a gap 25 therebetween. Each of the extending portions 14 can pass through the gap 25.

The guiding plate 22 defines a hole 223 in a joint between the first guiding plate 221 and the second guiding plate 222. Two blocks 224 are defined on the first guiding plate 221 adjacent to the hole 223. The stop plate 23 perpendicularly extends from a periphery edge of the upper surface 210 of the base 21 and is located at one same side of the base 21 as the guiding plate 22. The stop plate 23 and the guiding plate 22 are parallel to each other. A post 231 extends from the stop plate 23 toward the guiding plate 22 and aligns with the hole 223. The snap plate 24 is attached on the lower surface 212 and extends from a free end thereof. A clip 241 is defined on the free end of snap plate 24. The clip 241 and the base 21 cooperatively define a latching slot 243 therebetween configured for receiving the clasp 151 of the latching portion 15 on the housing 10, thereby latching the holder part 20 to the housing 10.

The elastic part 30 is a typical spring coiled around the protruding post 132 and the post 231. When the holder part 20 latches to the latching portion 15, the elastic part 30 is compressed to produce an elastic potential energy. When the holder part 20 departs from the latching portion 15, the holder part 20 is pushed out by the elastic potential energy of the elastic part 30.

Figure 4:
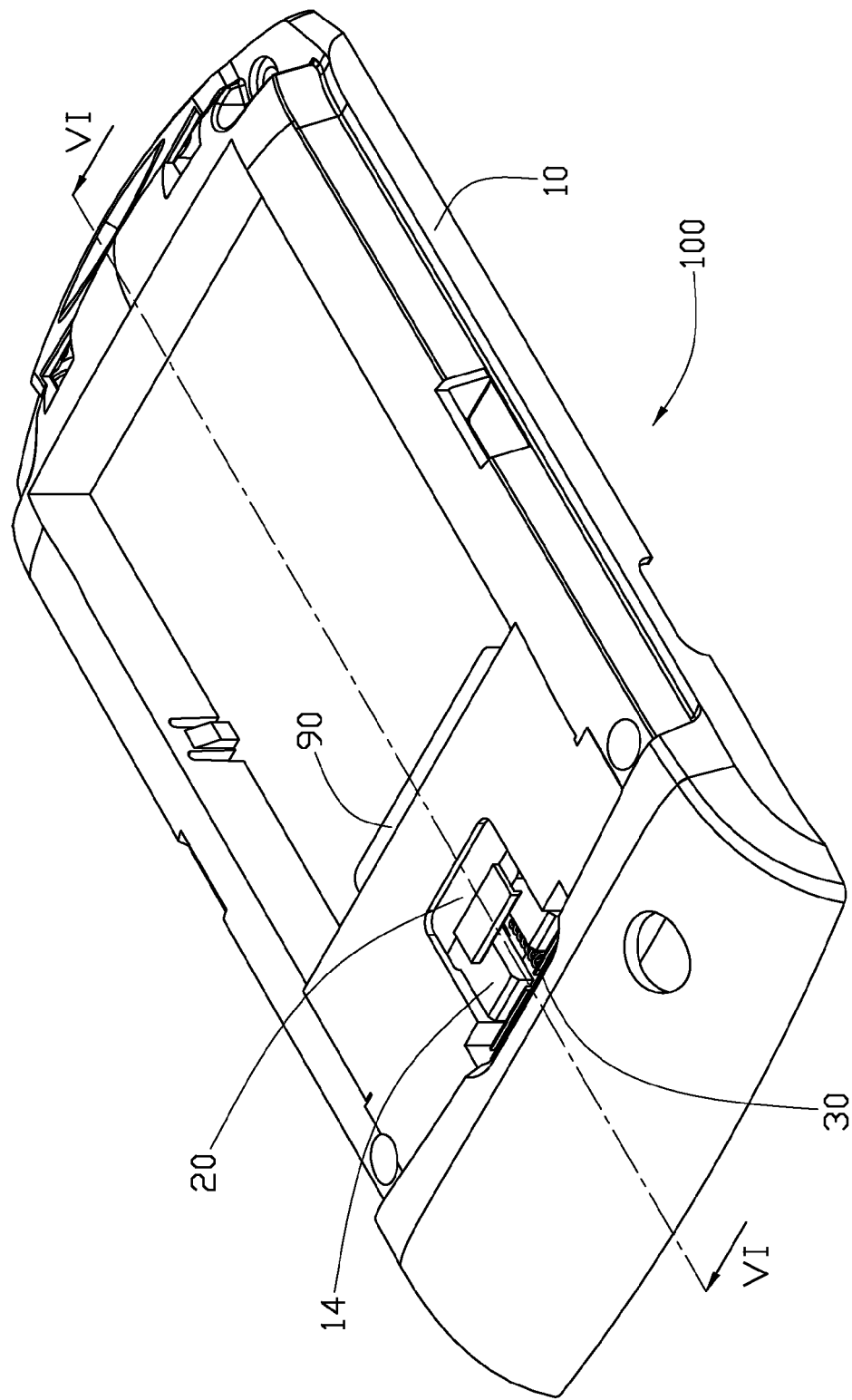
FIG. 4 is an isometric, assembled view of the chip card holder shown in FIG. 1.
Figure 5:
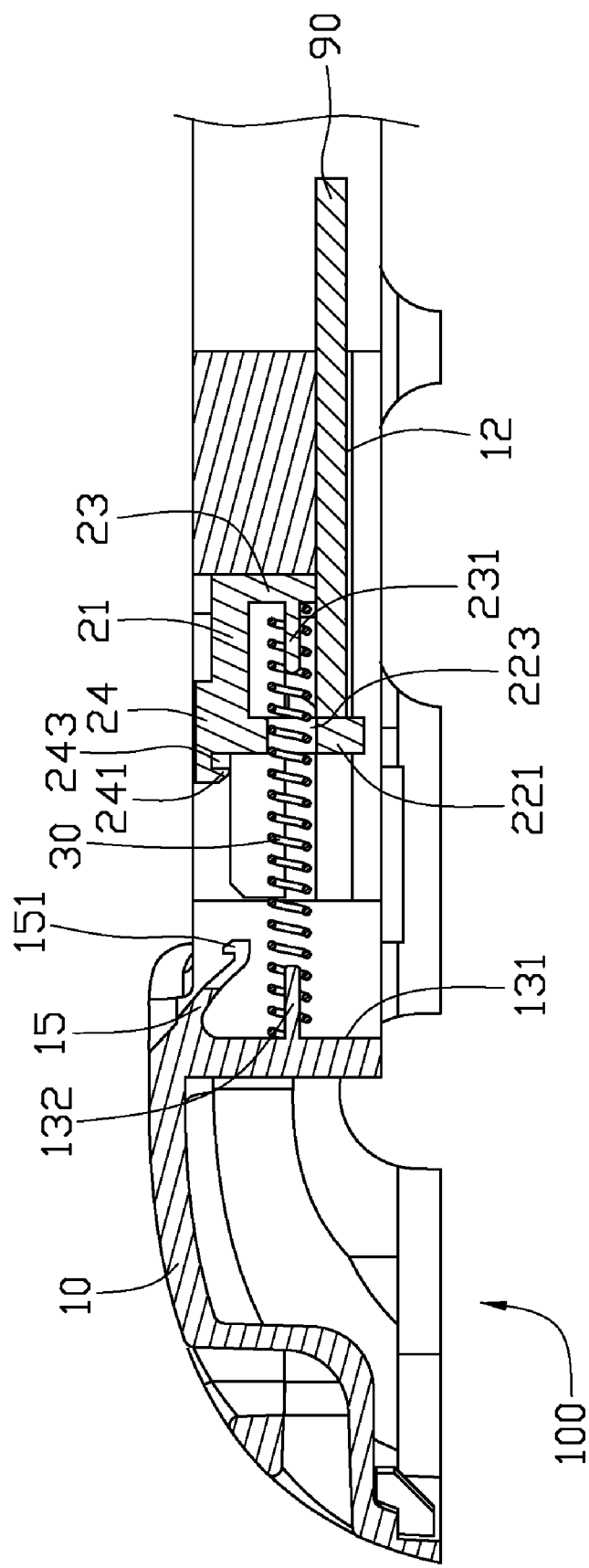
FIG. 5 is a cross-sectional view of the chip card holder taken along line V-V shown in FIG. 2.
Figure 6:
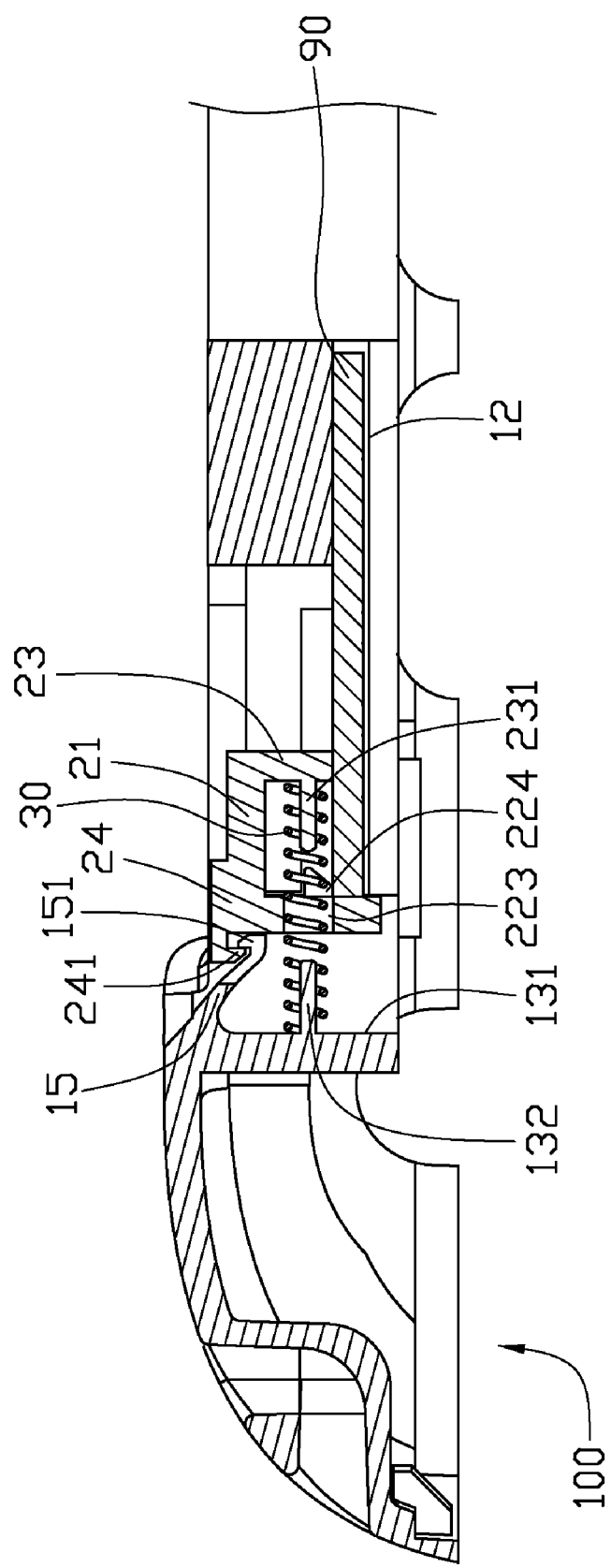
FIG. 6 is a cross-sectional view of a chip card completely received in the chip card holder shown in FIG. 4.
Figure 7:
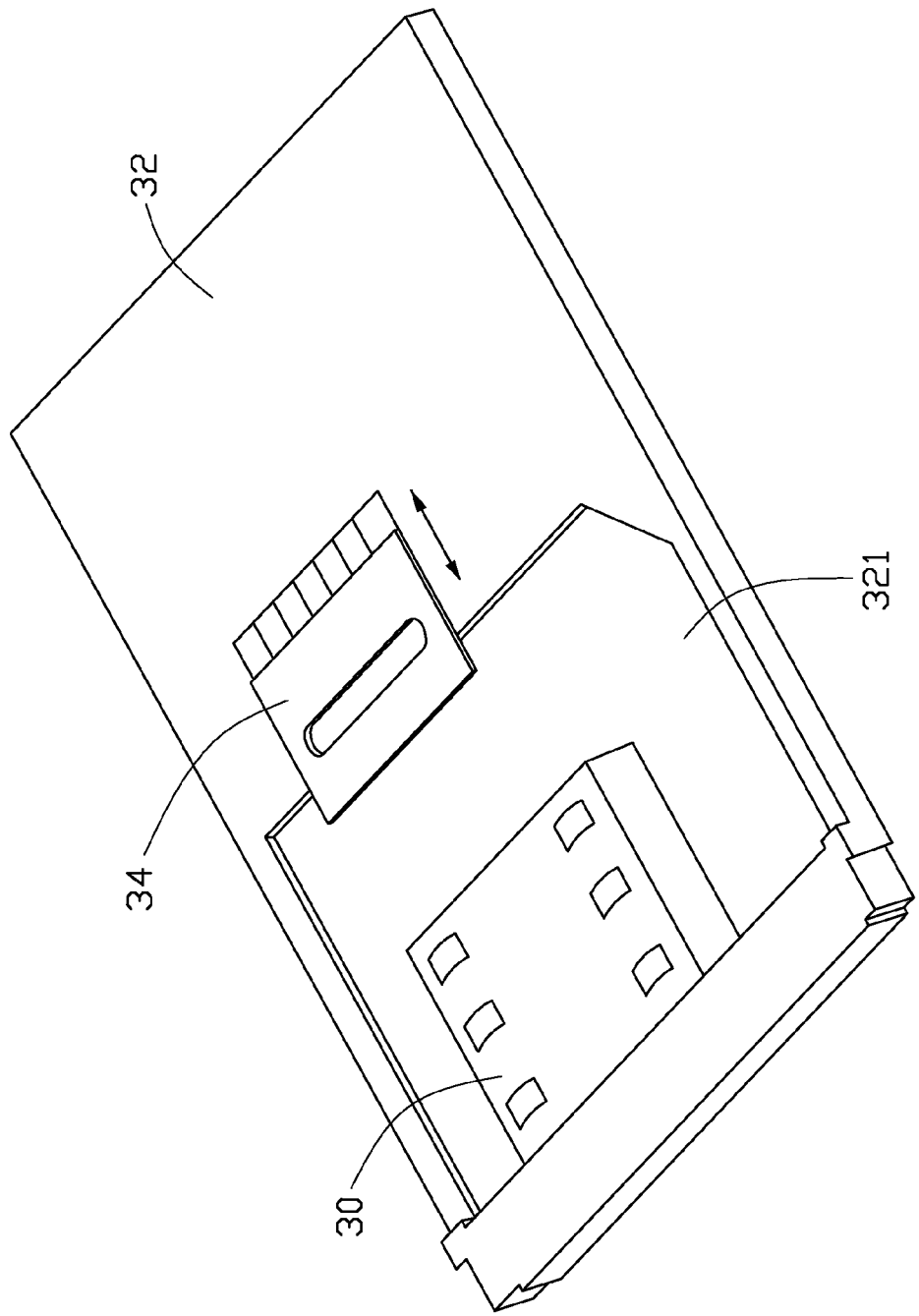
FIG. 7 is isometric view of a chip card holder according to a prior art.

Referring to FIG. 4, FIG. 5 and FIG. 6, when the chip card holder 100 is to be assembled, an end of the elastic part 30 passes through the hole 223 and coils around the post 231. Another end of the elastic part 30 coils around the protruding post 132. The elastic part 30 is compressed to produce an elastic potential energy. The guiding plate 22 is inserted into the through hole 13. Each of the extending portions 14 is received in the gap 25. The holder part 20 is slidably assembled on the extending portion 14 by the elastic potential energy of the elastic part 30.

During installation of the chip card 90 to the chip card holder 100, the chip card 90 is placed into the slot 12 and latches to the first guiding plate 221 and the blocks 224. The chip card 90 is pushed to drive the holder part 20 to slide from the extending portions 14 toward the end wall 131. Meanwhile, the elastic part 30 is compressed by the end wall 131 and the holder part 20. When the clasp 151 is received in the latching slot 243, the chip card 90 is completely received in the slot 12.

When the chip card 90 is taken out from the card holder 100, the latching portion 15 is pressed downwardly by an external force such that the clasp 151 moves toward the protruding post 132 until the clasp 151 removes out of the latching slot 243. At this moment, the holder part 20 slides on the extending portions 14 and moves away from the end wall 131 under the elastic force of the elastic part 30. Thus, the chip card 90 is pushed out of the slot 12 by the first guiding plate 221.

It is to be understood that the blocks 224 can be omitted.

It is to be understood that the stop plate 23 and the post 231 can be omitted, the elastic part 30 can directly fix on the guiding plate 22.

It is to be understood that the holder part 20 can be directly slidably placed in the slot 12. The chip card 90 pushes the holder part 20 latching to the latching portion 15.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A chip card holder used to hold a chip card, comprising:
a housing defining a slot for receiving the chip card, and an end wall, the housing including a latching portion extending from the end wall;
a holder part slidably assembled in the slot of the housing including a base, a snap plate attaching to the base, and a clip positioned on a free end of the snap plate and configured for latching the holder part to the housing;
an elastic part between the housing and the holder part;
wherein the holder part releasably latches to the latching portion;
when the latching portion is removed from the holder part, the holder part slides away from the end wall under the expansion of elastic part to push the chip card out of the slot.

2. The chip card holder as claimed in claim 1, wherein the latching portion has a clasp, the clip and the base defining a latching slot therebetween configured for receiving the clasp.

3. The chip card holder as claimed in claim 2, the slot having an opening defined in a bottom wall thereof, a plurality of sidewalls at least partially enclose the opening, each of two opposite sidewalls having an extending portion extending from the sidewalls, two extending portions defining a slide slot therebetween, the holder part sliding in the slide slot.

4. The chip card holder as claimed in claim 3, wherein the holder part further includes a guiding plate positioned on the base and located at an opposite side of the snap plate, the guiding plate engaging with the slide slot.

5. The chip card holder as claimed in claim 4, wherein the guiding plate defines a hole, the holder part defines a stop plate aligning with the hole, the elastic part passing through the hole and interacting against the stop plate.

6. The chip card holder as claimed in claim 5, wherein the stop plate defines a post toward the guiding plate, the housing defines a protruding post toward the stop plate, an end of the elastic part passes through the hole and coils around the post, another end of the elastic part coils around the protruding post.

7. The chip card holder as claimed in claim 4, wherein the guiding plate is T-shaped, including a first guiding plate and a second guiding plate extending from a middle of the first guiding plate, the second guiding plate positioned on the base, the first guiding plate and the base defining a gap, the second guiding plate slides in the slide slot, and the extending portion passes through the gap.

8. A portable electronic device, comprising:
a chip card holder used to hold a chip card;
a housing defining a slot for receiving the chip card, and an end wall, the housing including a latching portion extending from the end wall;
a holder part slidably assembled in the slot of the housing including a base, a snap plate attaching to the base, and a clip positioned on a free end of the snap plate and configured for latching the holder part to the housing;
an elastic part between the housing and the holder part;
wherein the holder part releasably latches to the latching portion;
when the latching portion is removed from the holder part, the holder part slides away from the end wall under the expansion of elastic part to push the chip card out of the slot.

9. The portable electronic device as claimed in claim 8, wherein the latching portion has a clasp, the clip and the base defining a latching slot therebetween configured for receiving the clasp.

10. The portable electronic device as claimed in claim 9, the slot having an opening defined in a bottom wall thereof, a plurality of sidewalls at least partially enclose the opening, each of two opposite sidewalls having an extending portion extending from the sidewalls, two extending portions defining a slide slot therebetween, the holder part sliding in the slide slot.

11. The portable electronic device as claimed in claim 10, wherein the holder part further includes a guiding plate positioned on the base and located at an opposite side of the snap plate, the guiding plate engaging with the slide slot.

12. The portable electronic device as claimed in claim 11, wherein the guiding plate defines a hole, the holder part defines a stop plate aligning with the hole, the elastic part passing through the hole and interacting against the stop plate.

13. The portable electronic device as claimed in claim 12, wherein the stop plate defines a post toward the guiding plate, the housing defines a protruding post toward the stop plate, an end of the elastic part passes through the hole and coils around the post, another end of the elastic part coils around the protruding post.

14. The portable electronic device as claimed in claim 11, wherein the guiding plate is T-shaped, including a first guiding plate and a second guiding plate extending from a middle of the first guiding plate, the second guiding plate positioned on the base, the first guiding plate and the base defining a gap, the second guiding plate slides in the slide slot, and the extending portion passes through the gap.

15. A chip card holder used to hold a chip card, comprising:
a housing defining a slot for receiving the chip card, and an end wall, the housing including a latching portion extending from the end wall;

a holder part slidably assembled in the slot of the housing, and defining a clip thereon, the holder part including a base, and a snap plate attaching to the base, the clip positioned on a free end of the snap plate, the clip and the base define a latching slot configured for receiving the latching portion;

an elastic part between the housing and the holder part;

wherein the clip releasably latches to the latching portion; when the latching portion detaches from the clip, the holder part slides away from the end wall under the expansion of elastic part to push the chip card out of the slot.

16. The chip card holder as claimed in claim 15, wherein the latching portion has a clasp configured for latching into the latching slot.

* * * * *